(No Model.)
L. B. ROWLEY.
SECONDARY BATTERY.
No. 495,638. Patented Apr. 18, 1893.
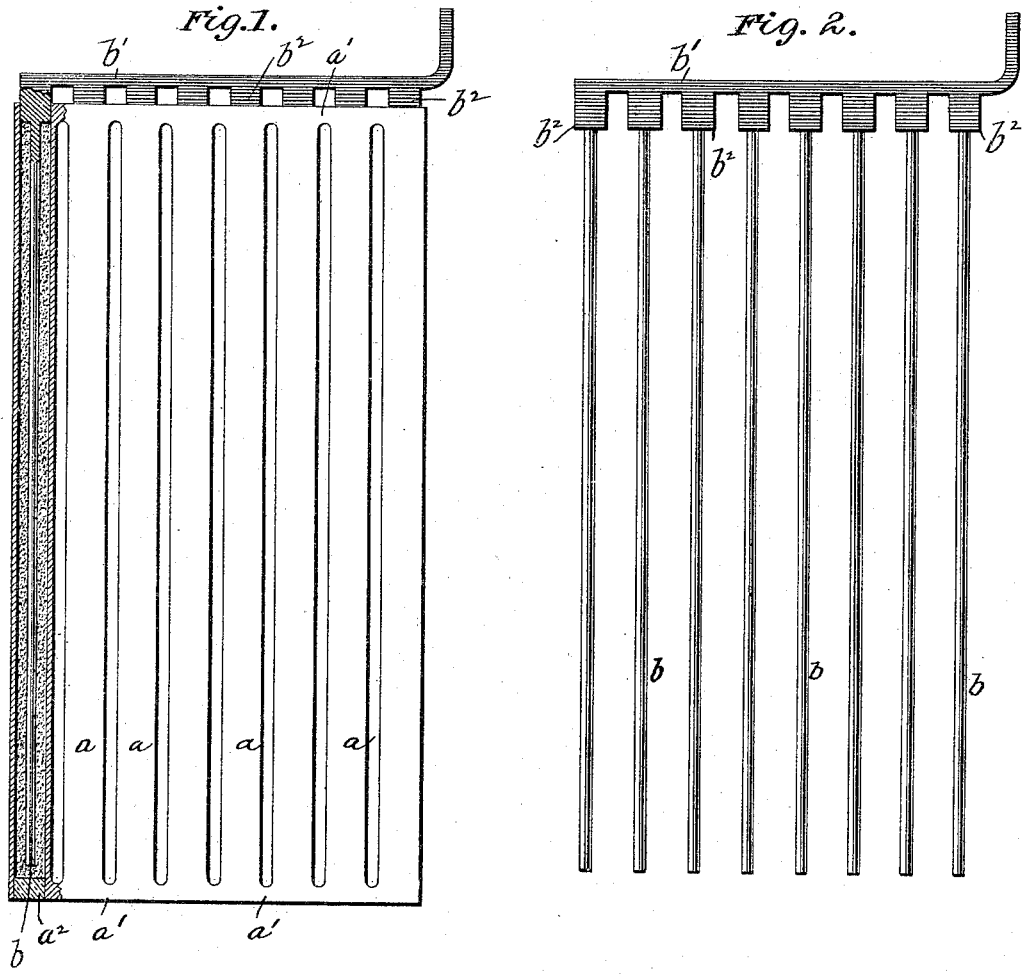
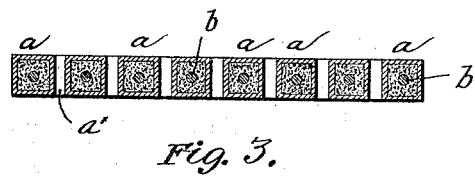
Fig. 3.
WITNESSES:
Frank S. Ober
Jos. J. Uhl
INVENTOR
Leslie B. Rowley
BY
Rosenbaum
ATTORNEY.

UNITED STATES PATENT OFFICE.

LESLIE BROOKS ROWLEY, OF ASHLAND, WISCONSIN.

SECONDARY BATTERY.

SPECIFICATION forming part of Letters Patent No. 495,638, dated April 18, 1893.

Application filed September 23, 1892. Serial No. 446,669. (No model.)

*To all whom it may concern:*

Be it known that I, LESLIE BROOKS ROWLEY, a citizen of the United States, residing at Ashland, in the county of Ashland and State of Wisconsin, have invented certain new and useful Improvements in Secondary Batteries, of which the following is a full, clear, and exact description.

This invention relates to secondary batteries, the object being to provide a construction of plate or electrode which will prevent the displacement of active material, which will be cheap of construction, of low resistance, and to which the active material may be easily applied.

In general the invention consists of a plate made up of a series or gang of tubes of porous non-conducting material, in each of which is inclosed active material and an electric conductor.

The invention will be described in detail with reference to the accompanying drawings, in which, Figure 1 represents a side elevation of my improved electrode, one of the tubes being shown in section. Fig. 2 represents a side elevation of the complete conductor detached from the tubes, and Fig. 3 represents a transverse section through the plate.

Referring to the drawings by letter, $a$, $a$, &c., represent a series or gang of tubes made preferably square or rectangular in cross-section, although they may be circular or of any other desired shape. These tubes are located parallel to each other and occupy the same plane. They are connected together across the top and across the bottom by webs $a'$, formed integrally with the tubes and of the same material. It is preferable to construct the tubes in this manner, but they may be secured at the top and bottom by cross-pieces of hard rubber, celluloid or other acid proof material. The tubes are made of terra cotta, compressed asbestos or other non-conducting material having sufficient strength and very porous, so that the fluids of the battery may easily pass through the walls of the tubes to the interior. Both ends of the tubes are open.

$b$, $b$, represent a series of rods or wires of lead or other suitable alloy corresponding to the series of tubes $a$ forming one electrode. These rods are disconnected at one end, but are connected together across their upper ends by a bar $b'$, and they are each surrounded at their upper ends just below the bar by a plug $b^2$ of such a shape and size as to fit into the upper end of the tubes $a$, and close said tubes comparatively tight; the bar $b'$ is extended at one end to form the connecting lug of the electrode. The series of rods thus complete is adjusted to the tubes by passing them respectively into the same until the plugs $b^2$ enter and close the upper ends of the tubes. The rods will then reach nearly to the bottom of the tubes and will be centered therein by the plugs $b^2$. The electrode is then turned up-side-down, and the active material poured or forced into the tubes until it entirely surrounds the rods and fills the tubes. The active material may be put in in the form of a dry powder or in the form of a paste, and I do not confine myself to any particular kind of active material. When the tubes are all full the lower ends of the tubes are sealed by plugs $a^2$ of acid proof material.

It will be observed that the active material entirely surrounds the conductors, and is itself exposed on all sides to the action of the liquid in the cell. No injurious warping can occur in a plate of this character, because any warping which may take place is confined to the individual tubes and cannot seriously affect the plate as a whole.

Having described my invention, I claim—

1. A secondary battery electrode comprising in combination, a supporting element consisting of a series of porous tubes, molded, cast, or otherwise formed into a homogeneous integral structure, a series of electrical conductors connected together and located respectively in said tubes, and active material in said tubes surrounding said conductors, substantially as described.

2. A secondary battery electrode comprising in combination, a supporting element consisting of a series of parallel porous tubes of non-conducting material connected together across the top and bottom and molded, cast, or otherwise formed into a homogeneous integral structure, a series of electrical conductors extending into one end of said tubes, said conductors being all connected together by a cross-bar and provided with enlargements or plugs which enter one end of said tubes to close the same and center the conductors in the tubes and active material surrounding the conductors in each tube, substantially as described.

In testimony whereof I subscribe my signature in presence of two witnesses.

LESLIE BROOKS ROWLEY.

Witnesses:
J. H. DOCHERY,
JOHN HYNES.